United States Patent [19]
Heredia

[11] Patent Number: 5,911,777
[45] Date of Patent: *Jun. 15, 1999

[54] METHOD AND APPARATUS FOR REPORTING UNAUTHORIZED ATTEMPT TO RELEASE A PORTABLE COMPUTER FROM A DOCKING STATION

[75] Inventor: Rafael Heredia, Easley, S.C.

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,952

[22] Filed: Jul. 5, 1996

[51] Int. Cl.$^6$ ...................................................... G06F 13/00
[52] U.S. Cl. ........................... 713/200; 713/201; 713/202; 710/101
[58] Field of Search ..................................... 395/281, 186, 395/187.01, 188.07, 650, 200.06, 282, 283, 309; 340/825.31; 380/423, 425, 23, 25

[56] References Cited

U.S. PATENT DOCUMENTS

| | | |
|---|---|---|
| 4,860,352 | 8/1989 | Laurance et al. . |
| 4,962,449 | 10/1990 | Schlesinger ............................. 395/187 |
| 5,299,436 | 4/1994 | Spitzer ........................................ 70/58 |
| 5,311,397 | 5/1994 | Harshberger et al. ................... 361/683 |
| 5,313,596 | 5/1994 | Swindler et al. ........................ 395/325 |
| 5,323,291 | 6/1994 | Boyle et al. . |
| 5,375,243 | 12/1994 | Parzych et al. .......................... 395/725 |
| 5,450,271 | 9/1995 | Fukushima et al. ..................... 361/686 |
| 5,475,839 | 12/1995 | Watson et al. . |
| 5,552,776 | 9/1996 | Wade et al. . |
| 5,557,742 | 9/1996 | Smaha et al. . |
| 5,577,209 | 11/1996 | Boyle et al. . |
| 5,648,762 | 7/1997 | Ichimura et al. . |

OTHER PUBLICATIONS

The Cyber Angel, Product Information, 1996.

Primary Examiner—Ayaz R. Sheikh
Assistant Examiner—Rupal D. Dharia
Attorney, Agent, or Firm—Ying Tuo

[57] ABSTRACT

A computer system is provided to prevent a portable computer from being removed from a docking station by a unauthorized person. When set in a password protection mode, the docking station demands a password to be entered in response to a undocking request. The docking station then checks the password entered. In the password protection mode, the docking station releases and ejects the portable computer only when the password is correctly entered. The computer system is able to record and report the unauthorized attempt to release the portable from the docking station.

7 Claims, 9 Drawing Sheets

METHOD AND APPARATUS FOR REPORTING UNAUTHORIZED ATTEMPT TO RELEASE A PORTABLE COMPUTER FROM A DOCKING STATION

BACKGROUND OF THE INVENTION

The present invention relates generally to portable computers and docking stations, and more particularly to docking stations having security mechanisms for preventing the portable computers from being removed from the docking stations by unauthorized persons.

It is known that portable computers (also known as notebook computers) can operate independently, without being connected to docking stations. If needed, however, portable computers can be inserted into docking stations, so that they can use peripherals such as monitors, keyboard, mice, printers, scanners, etc. Docking stations provide portable computers with a "one stop" quick connection to all the peripherals that are included in the docking stations.

A docking station is typically left in office or home environment. A portable computer is inserted into the docking station when the user of the docking station and portable computer intends to work in the office or home, and the portable computer is removed from the docking station when the user wants to use the portable computer in a forthcoming trip. This is known as docking to, and undocking from, the docking station.

Usually, a portable computer is relative small in size, light in weight and expensive in value. Thus, it is desirable to have a security system on docking stations that can prevent portable computers from being removed by unauthorized persons.

At present, one security system used for a docking station is to install a lock mechanism inside the docking station. When a portable computer is inserted into the docking station, the lock mechanism locks the portable computer. To remove the portable computer from the docking station, a key is used to manually release the lock mechanism.

Another security system that has been used for a docking station is to install, inside the docking station, a lock mechanism, an ejection switch, and an ejection mechanism for ejecting the portable computer out of the docking station. In response to activation of the switch, a release request is generated. In response to the release request, a software eject procedure is then invoked to release the lock mechanism and eject the portable computer.

U.S. Pat. No. 5,323,291 discloses a computer system including a portable computer and a docking station. The docking station there includes a lock mechanism, an electromechanical ejection mechanism, and an ejection switch. When the electronic ejection switch is pressed while the portable computer is in operation together with the docking station, an ejection request is generated to invoke the operating system running the computer system to execute a process to ensure data and changes to be appropriately saved. After data and changes have been appropriately saved, the electronic ejection mechanism ejects the portable computer out of the docking station. Applicant hereby incorporates U.S. Pat. No. 5,323,291 into the present application by reference.

Unfortunately, the existing security systems do not provide adequate safeguard to prevent a portable computer from being removed from a docking station, with the features of reliability, flexibility and convenience.

For example, in the case where a portable computer is ejected from a docking station in response to activation of an ejection switch, there is virtually no protection there. In the case where a key is used to release a lock mechanism in a docking station, it is difficulty and costly (if possible at all) to change the lock mechanism when the key is lost or duplicated by an unauthorized person. In addition, it is a common practice in the industry to have common locks in the same batch of computers and docking stations during the manufacture of the computer systems by a manufacturer. Thus, it is possible that several computer systems have build in the same batch may have the same key lock combination.

Moreover, it is desirable to record and report unauthorized attempts to undock a portable computer, so that appropriate preventative actions can be taken. However, the conventional security system is unable to record and report unauthorized attempt to undock a portable computer.

Therefore, there has been a need to provide security system and method that can provide adequate safeguard to prevent a portable computer from being removed from a docking station, with the features of reliability, flexibility and convenience.

There has been another need to provide security system and method that can record and report unauthorized attempt to undock a portable computer from a docking station.

The present invention can meet these needs.

SUMMARY OF THE INVENTION

In one aspect, the invention provides a method for reporting unauthorized attempt to remove a portable computer from a docking station. The method comprises the steps of:
   at the docking station:
      detecting a unauthorized attempt to release the portable computer from the docking station;
      denying said unauthorized attempt;
      sending a report for reporting said unauthorized attempt to a management station via a network, said report including network address information unique to the docking station;
   at the management station:
      receiving said report via the network;
      identifying location where said unauthorized attempt has occurred based on said network address information; and
      recording said unauthorized attempt together with said location.

BRIEF DESCRIPTION OF THE DRAWINGS

The purpose and advantages of the present invention will be apparent to those skilled in the art from the following detailed description in conjunction with the appended drawing, in which.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiment will be readily apparent to those skilled in the art, and the principles defined herein may be applied to other embodiments and applications without departing from the spirit and scope of the invention. Thus, the present invention is not intended to be limited to the embodiment shown, but is to be accorded with the broadest scope consistent with the principles and features to be disclosed herein.

Figure 1:
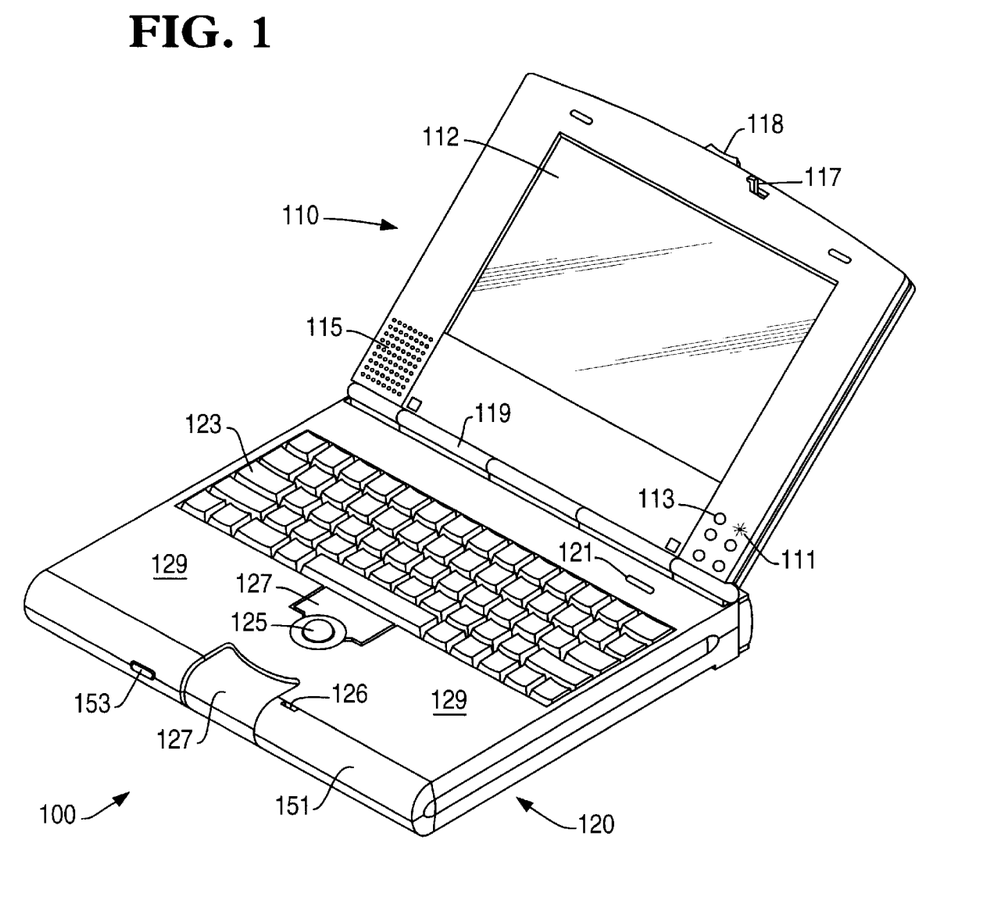
FIG. 1 is a front perspective of a portable computer.

Referring to FIG. 1 of the present application, there is shown a front perspective of a portable computer 100.

Figure 2:
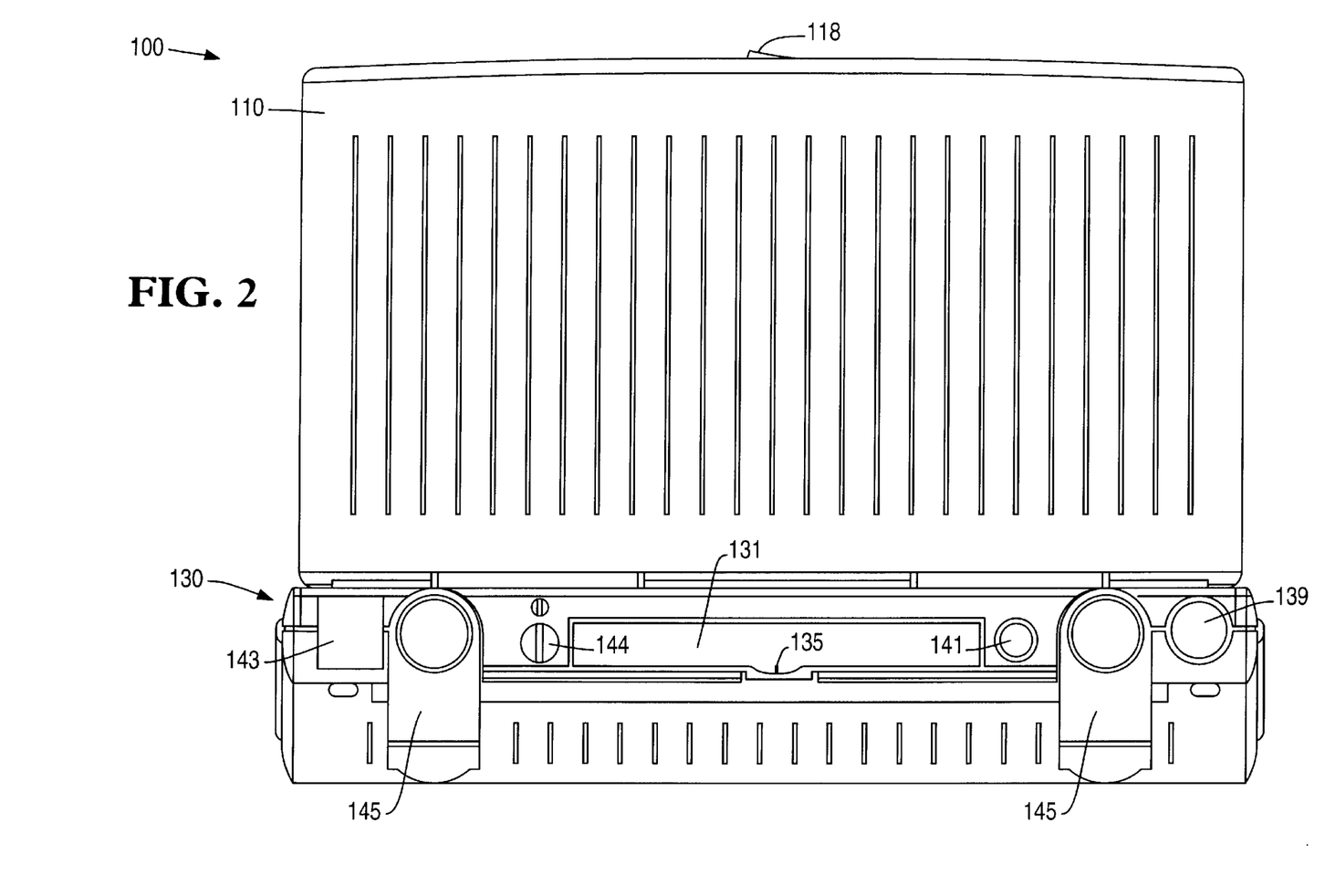
FIG. 2 is a back perspective of the portable computer of FIG. 1, with its docking connector covered and feet in the open position.

Referring to FIG. 2 of the present application, there is shown a back perspective of portable computer 100, with its docking connector covered and feet in the open position.

Figure 3:
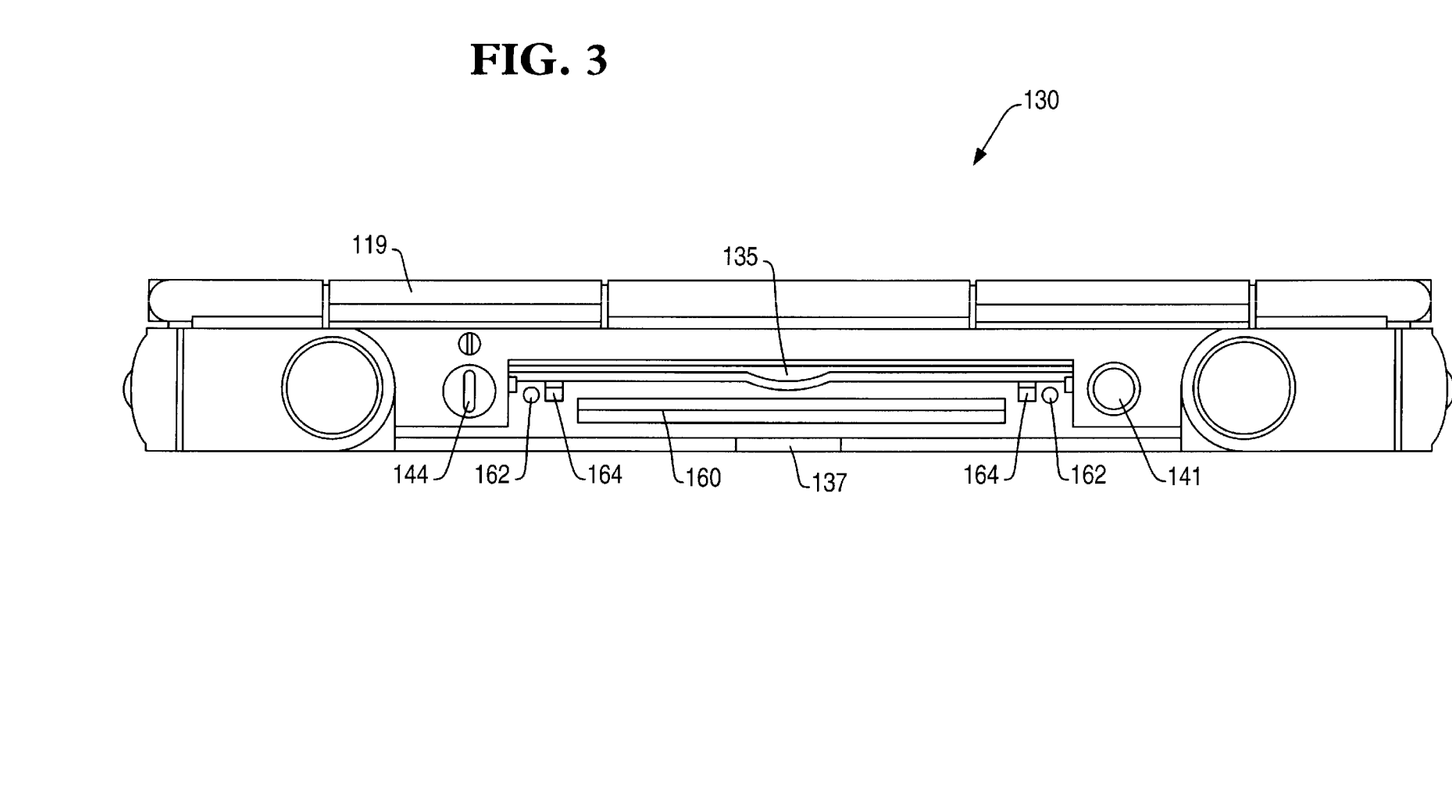
FIG. 3 is a back perspective of the portable computer of FIG. 1, showing the portable computer in a closed position with its feet in their closed position and with the docking connector covered.

Referring to FIG. 3 of the present application, there is shown a back perspective of portable computer 100, showing the portable computer in a closed position with its feet in their closed position and with the docking connector covered.

At lines 60–68 in column 3 through lines 1–47 in column 4, U.S. Pat. No. 5,323,291 describes the structure of the portable computer shown in FIGS. 1–3 in detail. Applicant hereby incorporates these lines of description into the present application by reference.

Figure 4A:
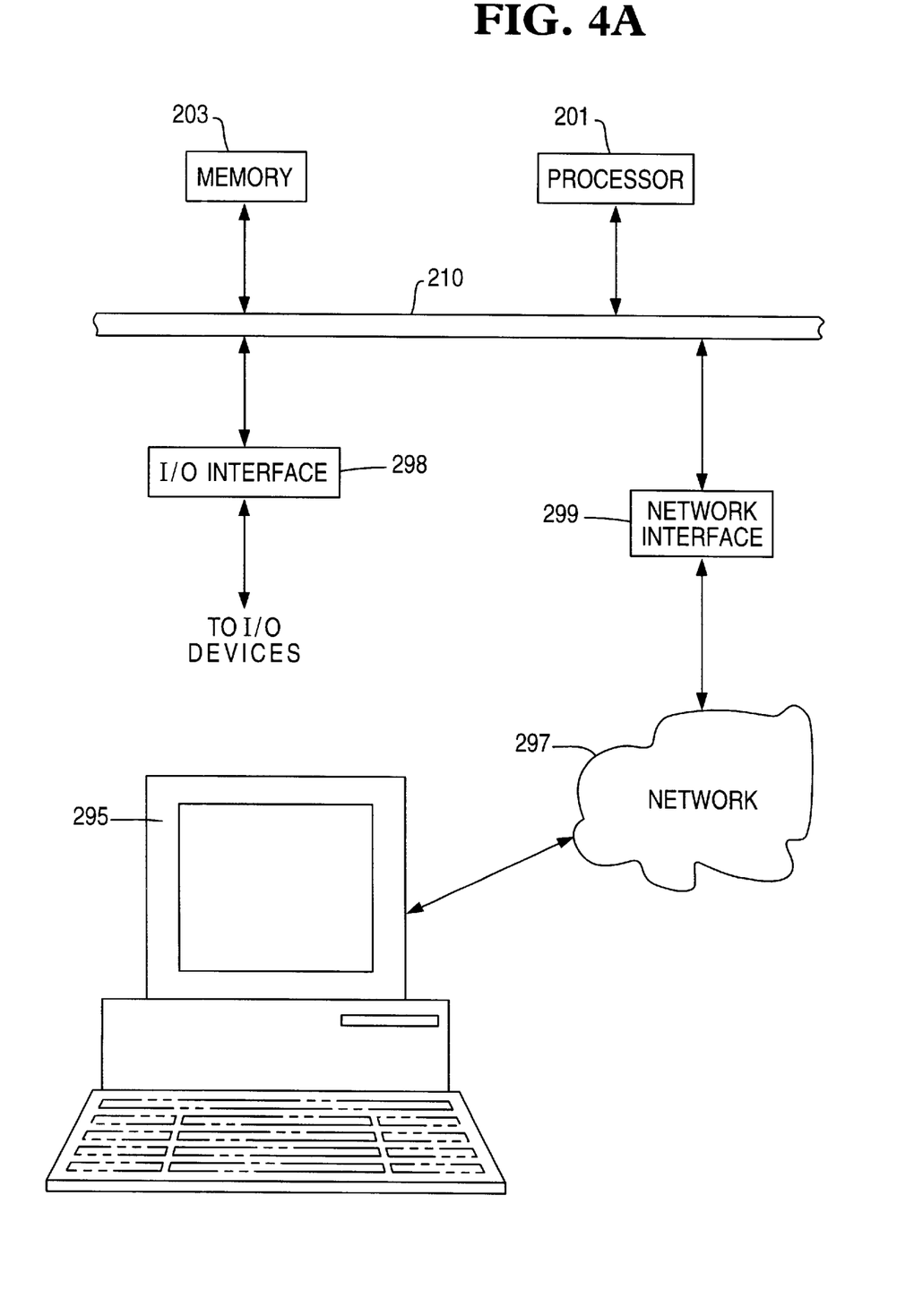
FIG. 4A is a block diagram of the portable computer in FIG. 1.

Referring to FIG. 4A, there is shown diagram of portable computer 100 in FIG. 1. Portable computer 100 can be either IBM or Apple compatible computer.

As shown in FIG. 4A, the portable computer includes four components: processor 201, memory 203, I/O interfaces 298, and network interface 299. The portable computer also includes a bus 210 which connects the four components.

Memory 203 is able to store software (including instructions and data). I/O interfaces 298 provides interfaces to input/output devices, such as display screen, keyboard, mouse, disk driver, and printer. Network interface 299 has a unique network address and is able to provide the interface between the portable computer and network 297. Processor 201 is able to get access to memory 203 and control overall operation of the portable computer by executing the software stored in memory 203. Via network interface 299, processor 201 is able to receive information from, and send information stored in memory 203 to, network 297.

Figure 4B:
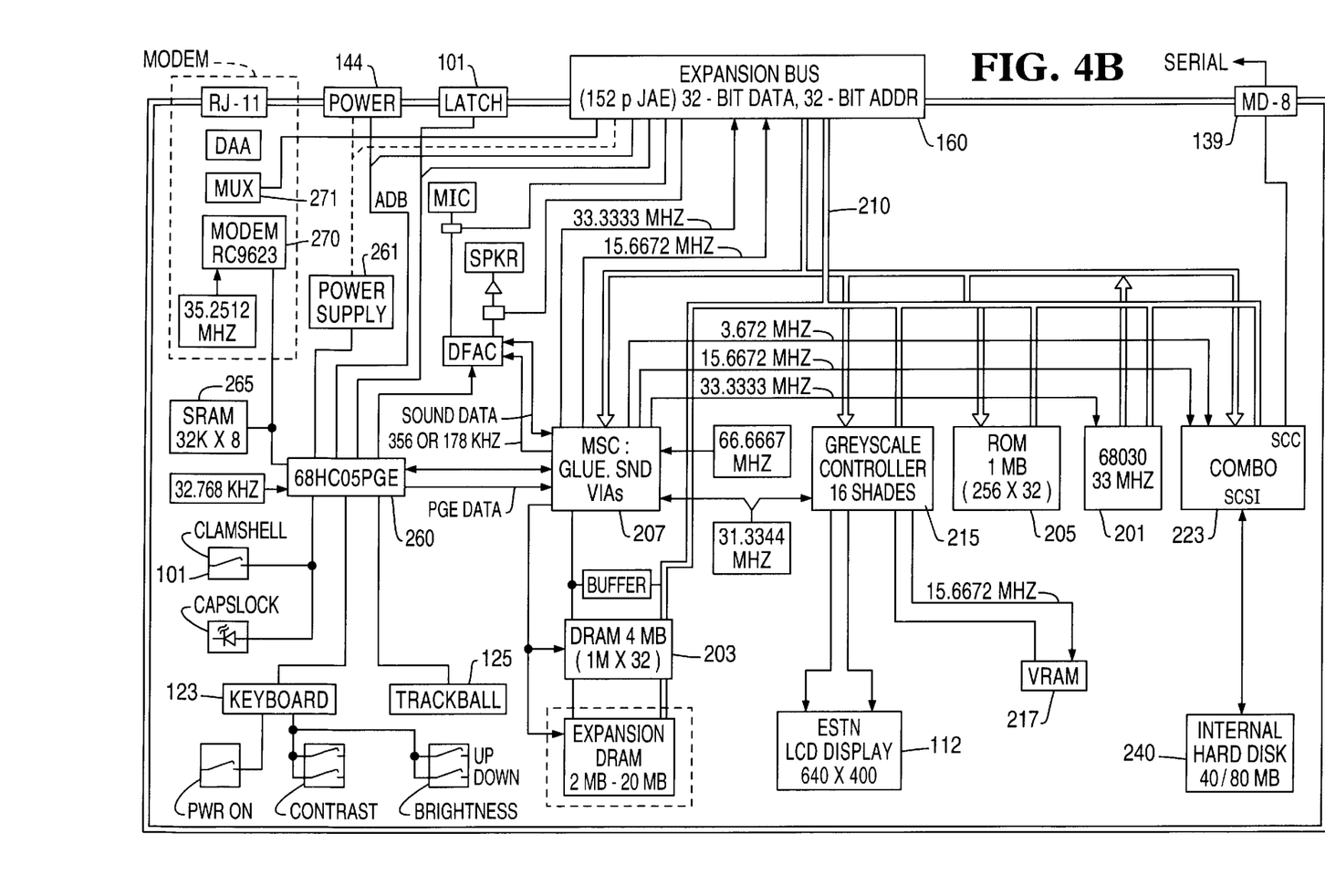
FIG. 4B shows the portable computer of FIG. 4A in greater detail.

Referring to FIG. 4B of the present application, there is shown the portable computer in FIG. 4A in greater detail.

At lines 48–68 in column 4 through lines 1–28 in column 5, U.S. Pat. No. 5,323,291 describes the portable computer shown in FIG. 4B in detail. Applicant hereby incorporates these lines of description into the present application by reference.

Figure 5:
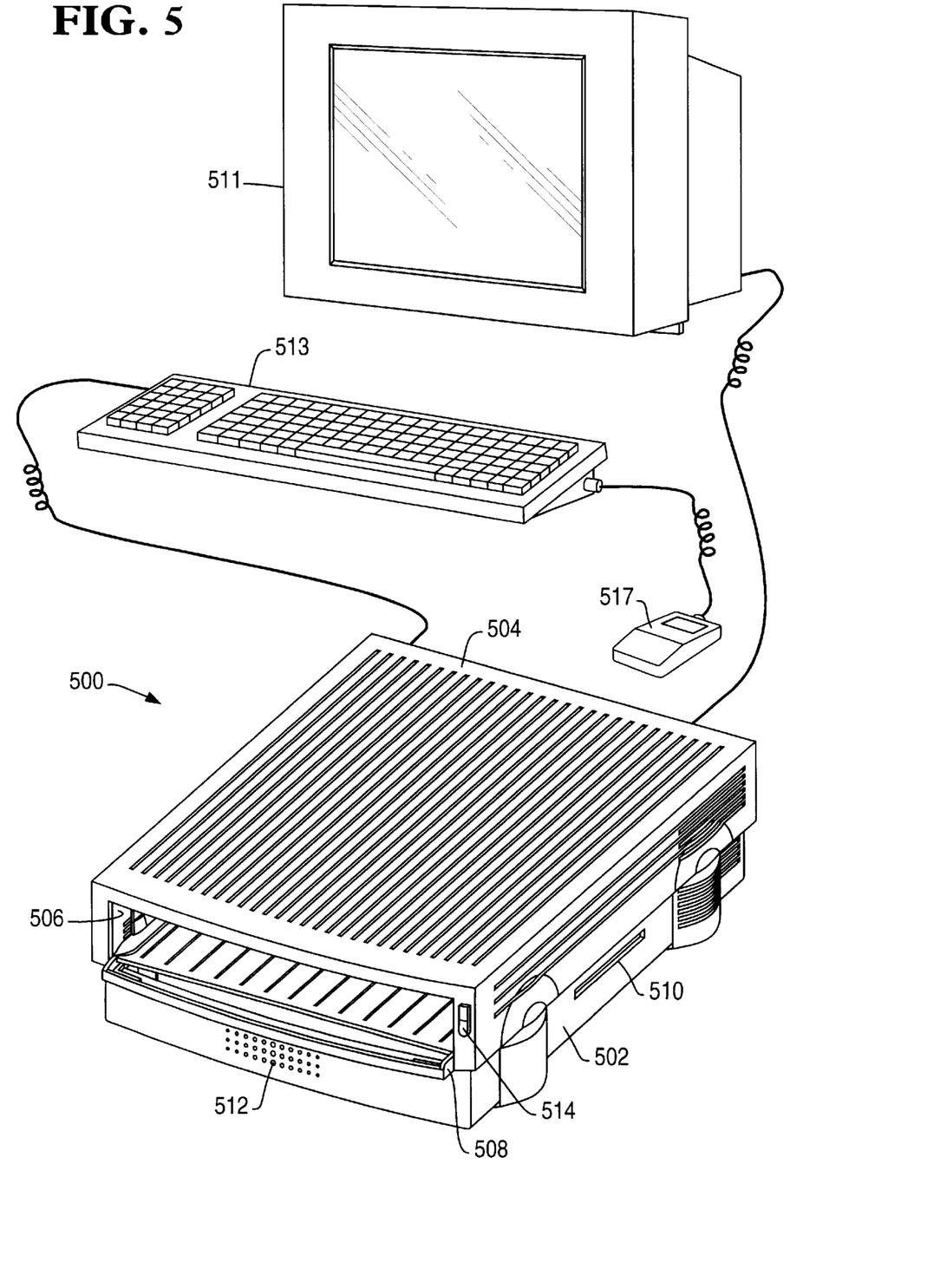
FIG. 5 is a front perspective of a docking station.

Referring to FIG. 5 of the present application, there is shown a front perspective of docking station 500. Disposed inside the docking station are a lock mechanism for locking the portable computer into the docking station and an electromechanical ejection mechanism for ejecting the portable computer out of the docking station.

In columns 5–12, together with its related FIGS. 5–20, U.S. Pat. No. 5,323,291 describes the lock mechanism and electromechanical mechanism ejection mechanism in detail. Applicant hereby incorporates these columns of description into the present application by reference.

As shown in FIG. 5 of the present application, docking station 500 is comprised of base 502, and top 504. Portable computer insertion slot 506 is formed by top 504 and the front lip of fry pan 508. Electrical ejection button 514 is disposed on the left front edge of top 504. Connected to docking station are display monitor 511 and key board 513.

A user can initiate a portable computer ejection process by either typing ejection command via keyboard 513, pressing electrical ejection button 514, or selecting a menu option via mouse 517.

Figure 6A:
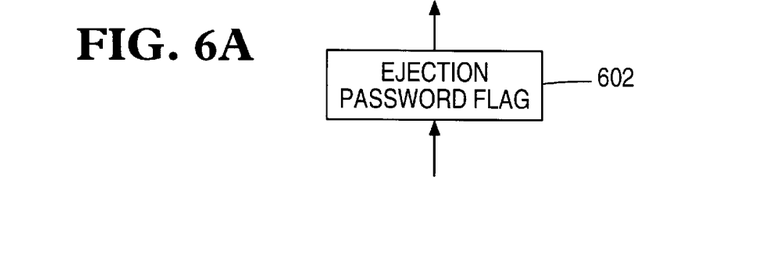
FIG. 6A is a block diagram of ejection password flag.

Referring to FIG. 6A, there is shown ejection password flag 602 that is setable and accessible by the operating system running the portable computer and docking station. When the ejection password flag is set in an active state, it indicates Ejection Password Protection function is enabled; when the ejection password flag is set in an inactive state, it indicates Ejection Password Protection function is disabled. Depending on the implementation, if BIOS (Basic Input and Output System) or firmware based password is used in the implementation, the password is set by using the standard BIOS system setup utility that is normally found in the boot ROM BIOS. If the password protection system is implemented in an operating system software, a separate password utility or other system control utility such as the control panel under the Microsoft Windows™ operating system can be used to enable and disable the password protection of system. The ejection password flag can be indicated by a bit in a register or memory. Or it can be indicated by a bit in an initialization file that is located in the default operating system directory. The password string or bit can be initialized or updated by either a password utility or the control panel utility mentioned earlier.

Figure 6B:
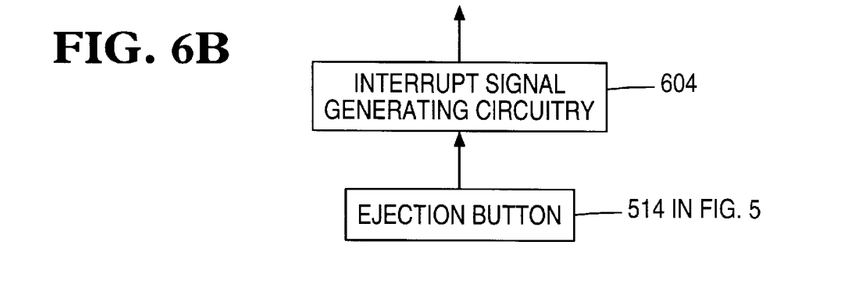
FIG. 6B is a block diagram of interrupt generating circuitry.

Referring to FIG. 6B of the present application, there is shown an block diagram of interrupt signal generating circuitry 604. In response to activation (pressing) of ejection button 514, typing ejection command via keyboard 513, or selecting a menu option via mouse 517, interrupt signal generating circuitry 604 generates an interrupt signal (ejection request) with a priority level same as SMI (system management interruption) priority level.

Figure 6C:
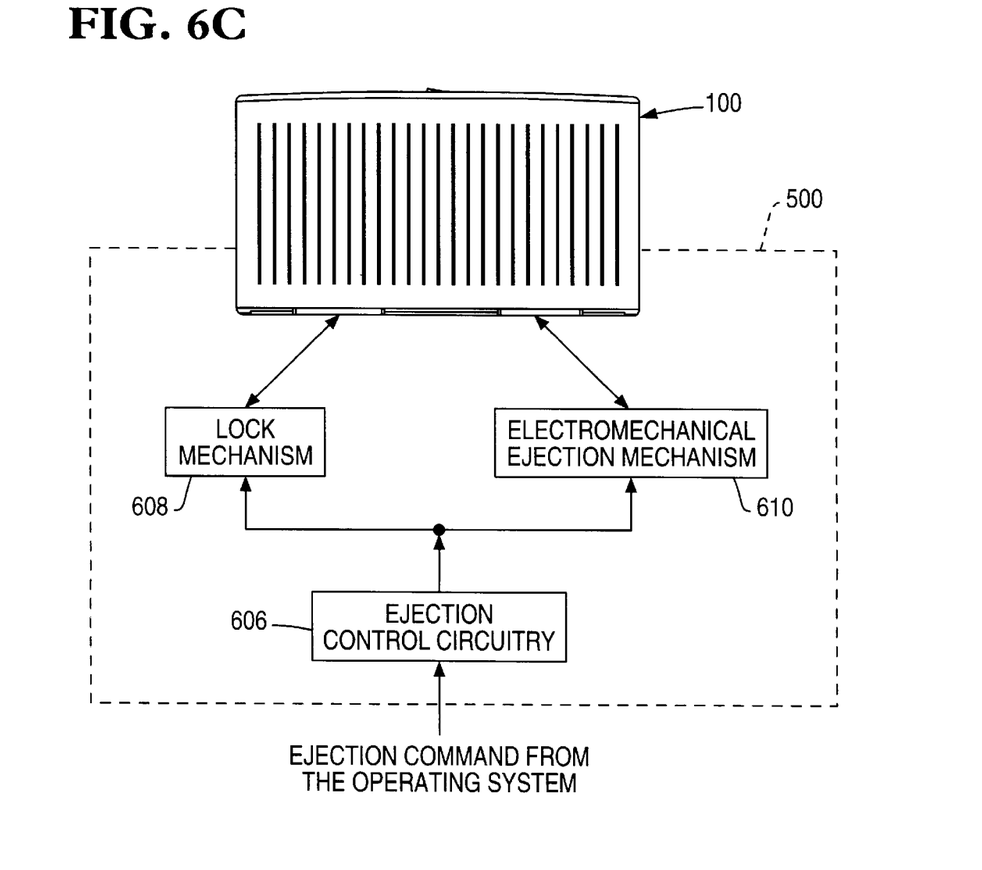
FIG. 6C is a block diagram of ejection control circuitry.

Referring to FIG. 6C of the present application, there is shown an ejection control circuitry 606 coupled to lock mechanism 608 and electromechanical ejection mechanism 610. As depicted in FIG. 6C, lock mechanism 608 is able to lock portable computer 100, and electromechanical ejection mechanism 610 is able to eject portable computer 100. In response to the ejection command from the operating system running portable computer 100 and docking station 500, ejection control circuitry 606 generates control signal to trigger lock mechanism 608 and electromechanical mechanism 610.

Figures 7, 7A:
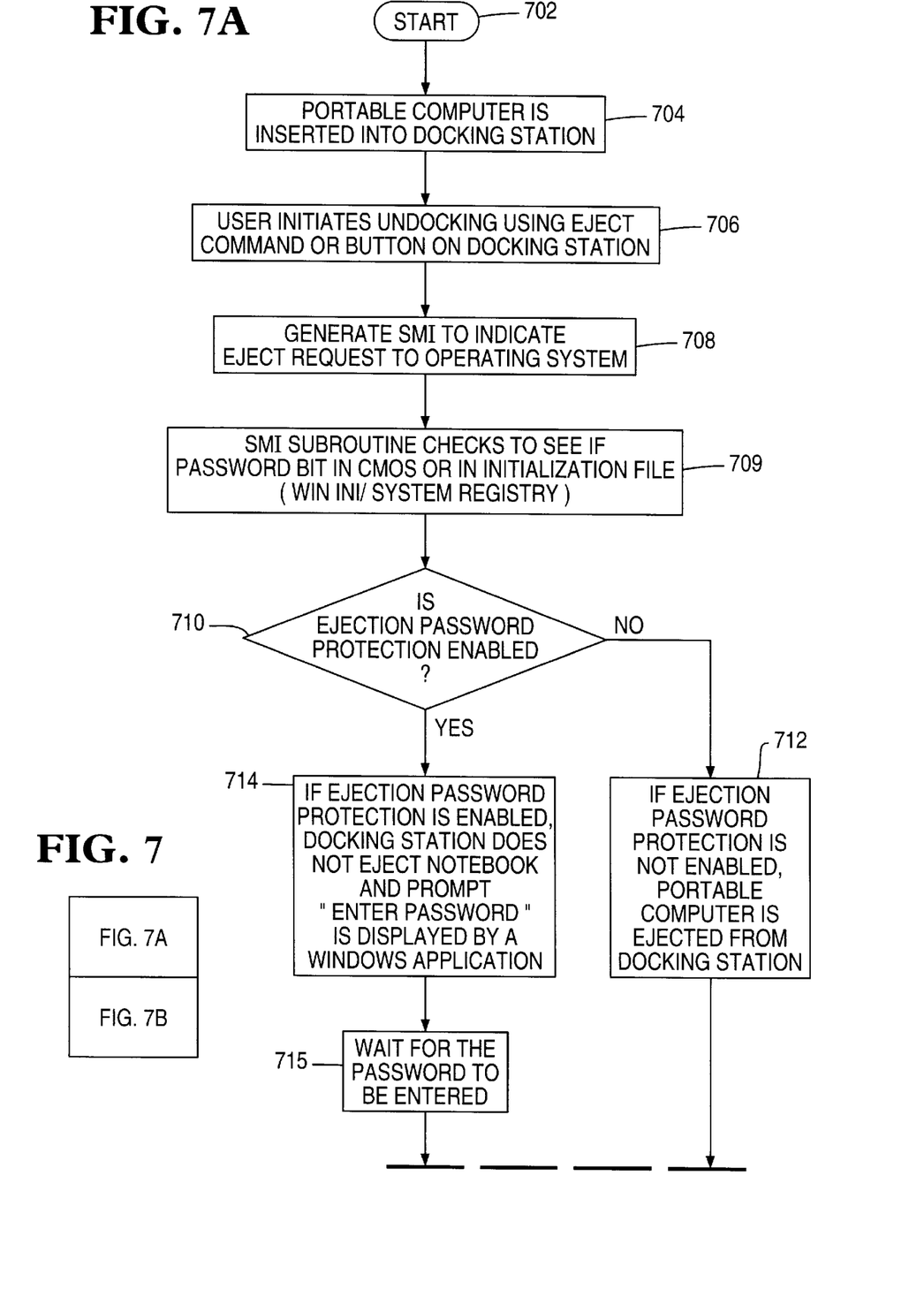
FIG. 7 is a flowchart illustrating the process of ejecting the portable computer from the docking station.
Figure 7B:
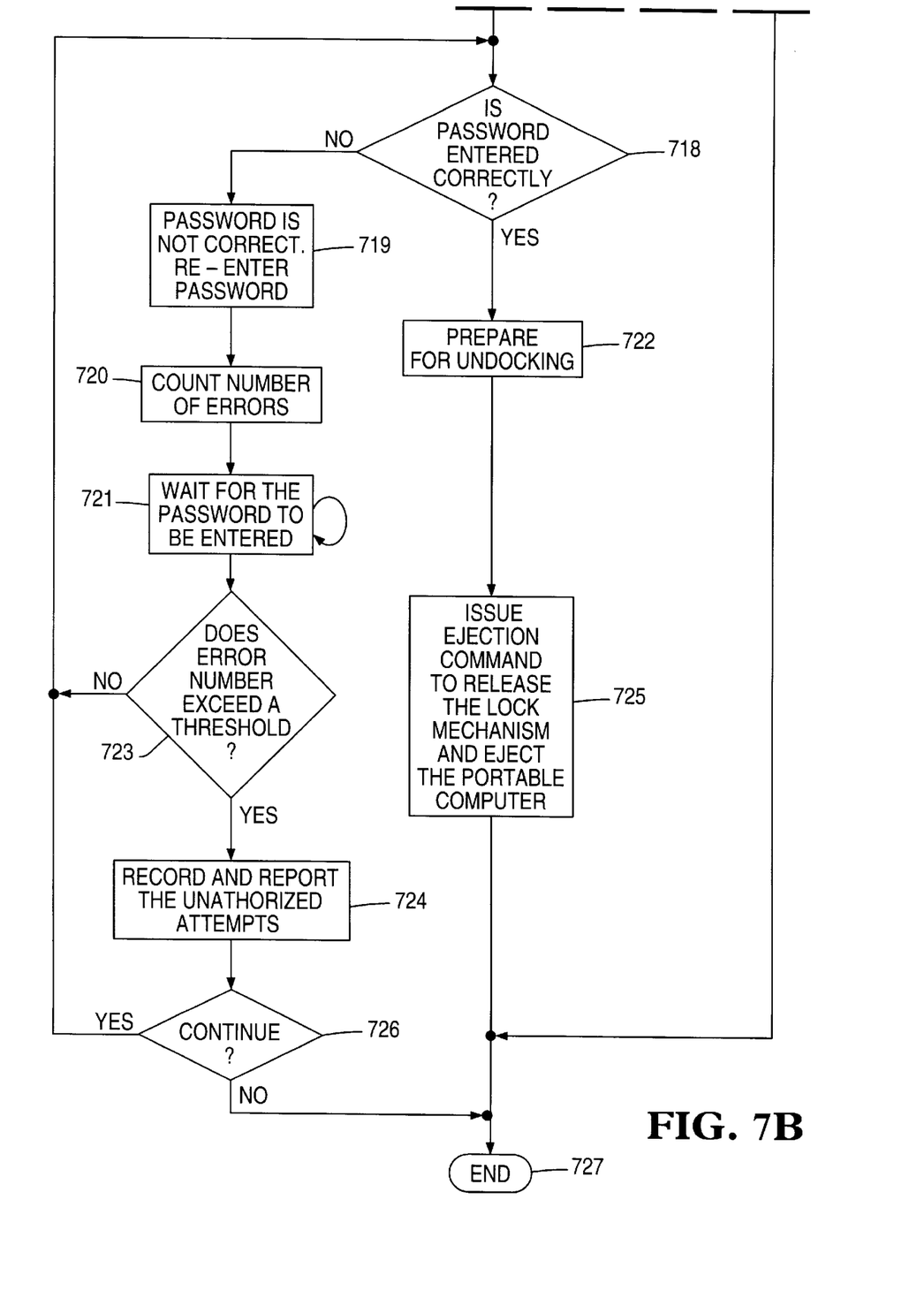

Referring to FIG. 7 of the present application, there is shown a flowchart illustrating the process of ejecting portable computer 100 from docking station 500.

In step 704, portable computer 100 is inserted into insertion slot 506 on docking station 500 (in FIG. 5) running an operating system having graphics-oriented display windows.

In step 706, an user initiates an ejection process by pressing ejection button 514, typing in ejection command via keyboard 513 or selecting a menu option via mouse 517 (see FIG. 5).

In step 708, interrupt signal generating circuitry 604 generates an ejection request to the operating system. Portable computers designed today have a method of communication of an event between the hardware and the software (BIOS) or operating system running these computers. This method is called SMI (system management interrupt). SMI is a non-maskable interrupt that is monitored by the hardware and forces the computer to execute code from a secure location in memory. SMI can be used to perform tasks such as cleaning up after a task switch or trapping events such as a docking or undocking request. Once the event is trapped, the hardware jumps into the SMI BIOS area, and this BIOS can perform additional measure such as determining if a flag in an CMOS memory has been set by the password utility or communicating to the operating system that an undocking event has occurred and requesting permission to undock.

In step 709, in response to the ejection request, the operating system invokes an SMI subroutine to determine whether Ejection Password Protection function is enabled by checking the ejection password flag 602 (which can be stored in a register, or in a memory address, or in an initialization in the operating system).

If the Ejection Password Protection function is not enabled, step 710 directs the operation to step 712. In step 712, the operating system issues an ejection command to ejection control circuitry 612 to trigger lock mechanism 608 and electromechanical ejection mechanism 610, so that portable computer 100 can be released and ejected from docking station 500.

If the Ejection Password Protection function is enabled, step 710 directs the operation to step 714.

In step 714, since the Ejection Password Protection is enabled, docking station 500 will not eject portable computer 100. Instead, prompt "Enter Password" is displayed on display monitor 511 (shown in FIG. 5) through BDOS (Basic Input and Output System) or through a windows application.

Step 715 waits for the password to be entered.

Step 718 checks whether the password entered is correct. If the password entered is not correct, step 718 directs the operation to step 719; if the password entered is correct, step 718 directs the operation to step 722.

In step 719, prompt "Password is not correct. Re-enter Password." is displayed on display monitor 511.

Step 720 counts the number of the passwords incorrectly entered. Because the password protection is under control of the operating system and BIOS, the number of repeated attempts and the exact time of the incidents can be readily monitored and tracked.

Step 721 waits for the password to be re-entered.

Step 723 determines whether the number of the passwords incorrectly entered exceeds a threshold. If it does not exceed the threshold, the operation loops back to step 718 to check whether the password entered is correct. If it exceeds the threshold, the operation is directed to step 724.

Step 724 records the unauthorized attempt to undock the portable computer into memory 203 and report the unauthorized attempt to an administrative location. A message can be sent via an electronic mail or other types of communication media to the network shown in FIG. 4A. A network management station can receive the report via the network. Because network interface 299 of FIG. 4A has a unique network address, the location of the unauthorized attempt also can be readily reported.

Step 726 makes a decision as to continue to accept undocking password. If the decision is positive, the operation is looped back to step 718. If the decision is negative, the portable computer will stop accept password.

If step 718 determines that password is correctly entered, step 722 prepares for ejecting portable computer 100. In step 722, the system continues the standard undocking process of verifying that no files are open and all other housekeeping functions are complete. Then the system will notify the docking station that is ready to release the portable computer.

In step 725, the operating system issues an ejection command to ejection control circuitry 612 to trigger lock mechanism 608 and electromechanical ejection mechanism 610, so that portable computer 100 can be released and ejected from docking station 500.

Alternatively, the password mechanism can be implemented using the system BIOS and doing writes to the screen using a hardware cursor mechanism or using through a Windows application. This application communicates through either a system registry file which is located in Microsoft Windows™ operating system directory or an initialization file like Microsoft Windows™ win.ini file. The SMI system can make a security system operating system independent enabling the protection mechanism to be hardware controlled and administrated, and make the password mechanism more secure.

In the present invention, the program for performing functions shown in FIG. 7 can be stored in memory 203 and executed by processor 201 (see FIG. 4A).

While the invention has been illustrated and described in detail in the drawing and foregoing description, it should be understood that the invention may be implemented through alternative embodiments within the sprit of the present invention. Thus, the scope of the invention is not intended to be limited to the illustration and description in this specification, but is to be defined by the appended claims.

What is claimed is:

1. A method for reporting an unauthorized attempt to remove a portable computer from a connection station, comprising the steps of:

at the connection station:
  detecting whether there is an unauthorized attempt to release the portable computer from the connection station at the portable computer;
  if there is a detected unauthorized attempt, then denying said unauthorized attempt;
  sending a report for reporting said unauthorized attempt to a management station via a network through an operating system, or system BIOS, operating the portable computer, said report including network address information unique to the connecting station;

at the management station:
  receiving said report via the network;
  identifying a location where said unauthorized attempt has occurred based on said network address information; and
  recording said unauthorized attempt together with said location, wherein said step of denying said unauthorized attempt includes generating an interrupt signal having a priority level the same as the SMI (System Management Interruption) priority level.

2. The method of claim 1, said report including time of said unauthorized attempt.

3. The method of claim 1, said report being sent by electronic mail via the network.

4. The method of claim 1, wherein the step of detecting an unauthorized attempt includes password protection under the control of the operating system or BIOS to monitor and track the number of repeated attempts and exact time of said attempts.

5. The method of claim 1, wherein said connecting station is a docking station.

6. The method of claim 1, wherein said denying step occurs through the SMI (System Management Interrupt).

7. The method of claim 1, wherein the unauthorized attempt is an ejection request.

* * * * *